UNITED STATES PATENT OFFICE.

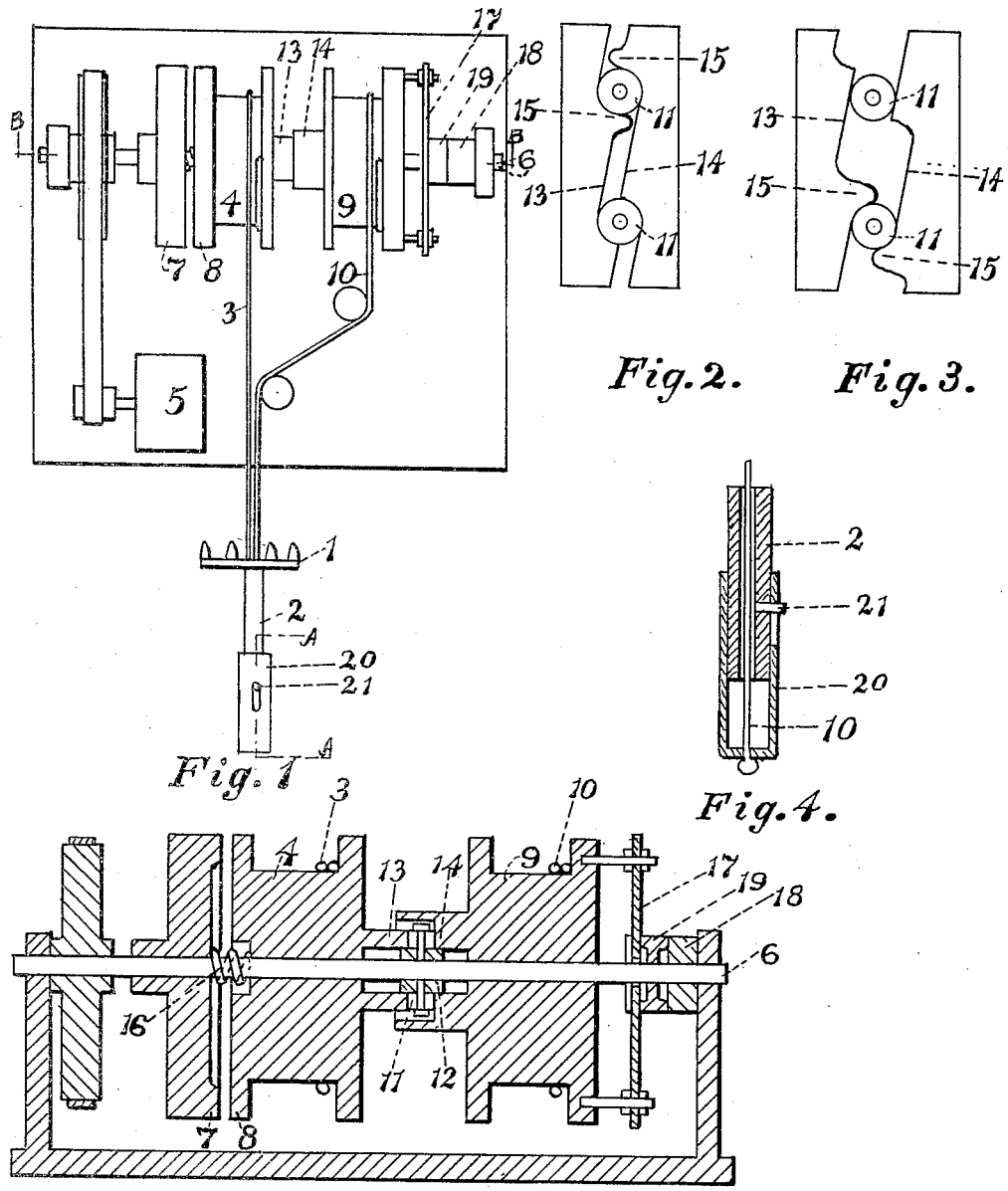

AARON E. BERGEY, OF BAZETTA TOWNSHIP, TRUMBULL COUNTY, OHIO.

MECHANISM FOR DRIVING TOOLS.

1,352,045.  Specification of Letters Patent.  Patented Sept. 7, 1920.

Application filed January 22, 1919. Serial No. 272,532.

*To all whom it may concern:*

Be it known that I, AARON E. BERGEY, a citizen of the United States, residing in Bazetta township, in the county of Trumbull and State of Ohio, have invented a new and useful Mechanism for Driving Tools, of which the following is a specification.

My invention relates to mechanisms for driving tools in which power is supplied to the tool by means of a rope or chain. It is intended chiefly for use in driving agricultural implements, though it may be used for other purposes. The object of my invention is to provide a mechanism that is efficient and economical, and that can be used for driving a great variety of tools.

I attain this object by mechanism illustrated in the accompanying drawings, in which,—

Figure 1 is a plan, Fig. 2 is a developed view showing the position of the clutch-shifting cam-and-tappet mechanism when the clutch is disengaged, Fig. 3 is a developed view showing the position of the clutch-shifting cam-and-tappet mechanism when the clutch is engaged, Fig. 4 is a section on the line A A, and Fig. 5 is a section on the line B B.

Similar characters refer to similar parts throughout the several views.

1 is a tool to be driven. This may be any suitable tool. A garden rake is shown in the drawings.

2 is the tool frame to which the tool 1 is attached. It is preferably of such form that it can be held by the operator's hand, so that it may be used as a handle, if desired.

3 is the driving rope. It may be of any suitable form or material. It is attached at its outer end to the frame 2, and at its inner end to a reeling mechanism.

4 is a reeling mechanism adapted to reel the rope 3 in and out. It is preferably in the form of a spool as shown in the drawings.

5 is a motor. It may be of any suitable type. It is connected with the spool 4 by means of suitable gearing, and so that the spool may be driven thereby. In case the spool 4 is mounted on a self-propelling vehicle, such as an automobile, farm tractor, &c., the motor 5 may be the motor of the self-propelling vehicle.

6 is the drive shaft. It is preferably mounted on the same frame as the motor 5. On it is mounted, revolubly, the spool 4. It is adapted to be driven, through suitable gearing, by the motor 5, in a forward direction.

I provide means for connecting and disconnecting the reeling mechanism 4 and the driving mechanism 5. When the mechanisms 4 and 5 are disconnected, the operator can move the tool 1 to any desired position, and when they are connected the reeling mechanism 4 pulls the tool 1 forwardly by means of the rope 3. I have shown in the drawings what I consider to be the most efficient and simple mechanism for connecting and disconnecting the spool 4 and motor 5.

7 is a clutch member revolving with the shaft 6.

8 is a clutch member revolving with the spool 4.

The clutch 7, 8 may be of any suitable type, a friction clutch of the disk variety being shown in the drawings.

9 is a control spool revolubly mounted on the shaft 6.

10 is a control rope. It is attached to the spool 9 at its inner end and to the frame 2 at its outer end.

The spools 4 and 9 are connected by gearing such that when the spool 9 is revolved forwardly with relation to the spool 4, the clutch 7, 8 becomes engaged and when the spool 9 is revolved backwardly, the clutch 7, 8 becomes disengaged. I have shown in the drawings what I consider to be the best form of this gearing.

11 is a tappet adapted to work in conjunction with a cam. It is preferably in roller form to reduce friction.

12 is a tappet sleeve on which the tappet 11 is mounted. It is revolubly mounted on the shaft 6.

13 and 14 are cams attached to the spools 4 and 9, respectively. They are adapted to work in conjunction with the tappet 11, and are formed so that when the spool 9 revolves forwardly with reference to the spool 4 the two spools are forced apart.

15 are teeth attached to the cams 13 and 14. They are adapted to prevent the cam 14 from turning too far with reference to the cam 13. The two extreme positions are shown in Figs. 2 and 3.

16 is a light spring which serves to keep the members 7 and 8 apart when the clutch 7, 8 is disengaged.

17 is the clutch spring. Through it is transmitted the end pressure when the clutch 7, 8 is engaged. It serves to regulate the clutch pressure and prevents the clutch from engaging too harshly. It is preferably attached to the spool 9 and provided with adjustment for wear, as shown in the drawings.

18, 19 is a friction drive by means of which the shaft 6 can drive the spool 9 forwardly so as to engage the clutch 7, 8.

The member 18 is attached to and revolves with the shaft 6. The member 19 is attached to and revolves with the spool 9. The contact surfaces of the members 18 and 19 are made such that the forward torque that can be exerted by the shaft 6 on the spool 9 through the friction drive 18, 19, is always greater than the backward torque exerted by the spool 4 on the spool 9 through the cam-and-tappet mechanism 13, 11, 14.

It will be seen that the operator, by pulling on the rope 10, can exert a backward torque on the spool 9, and that this backward torque is added to that of the mechanism 13, 11, 14. When the total backward torque becomes sufficiently great, the friction drive 18, 19 will slip and the clutch 7, 8 will become disengaged.

20 is a control handle mounted on the frame 2. To it is attached the rope 10.

21 is a pin attached to the frame 2. It is formed to fit in a slot in the handle 20 so that the handle 20 can be moved longitudinally, but can not turn on the frame 2.

It will be seen that when the operator pulls the control handle 20 backwardly, the clutch 7, 8 becomes disengaged, and the operator can move the tool 1 to any desired position. When the handle 20 is pushed forwardly, the friction drive 18, 19 will cause the clutch 7, 8 to engage, and the tool 1 is driven forwardly to do work.

It will be seen that if the clutch 7, 8 is a friction clutch, the mechanism described can be used as a braking mechanism. For the backward torque exerted on the member 7 by the member 8 depends on the clutch pressure, which in turn depends on the magnitude of the backward torque exerted on the member 14 by the operator.

It is evident that the mechanism described can be used for driving tools such as hoists, shafts, chucks, brakes, &c., as well as for driving tools that are to be held by hand.

The mechanism will operate without a roller bearing being placed between the thrust cams 13 and 14. But in this case there will be greater friction, and the clutch will be harder to release.

I claim:

1. In a mechanism for driving tools, a main friction clutch driving member, a control friction clutch driving member running in unison therewith, a main friction clutch driven member adapted to be driven by the said main friction clutch driving member, a control friction clutch driven member adapted to be driven by the said control friction clutch driving member and revolving normally in unison with the said main friction clutch driven member, and a clutch thrust mechanism connecting the two said friction clutch driven members, said clutch thrust mechanism being provided with a roller bearing through which the clutch pressure is transmitted, said clutch thrust mechanism being constructed so that when the two said friction clutch driven members are turned out of unison in one direction the said main clutch members become engaged and when the said friction clutch driven members are turned out of unison in the opposite direction the said main clutch members become disengaged, substantially as described.

2. In a mechanism for driving tools, a main friction clutch driving member, a control friction clutch driving member running in unison therewith, a main friction clutch driven member adapted to be driven by the said main friction clutch driving member, a control friction clutch driven member adapted to be driven by the said control friction clutch driving member and revolving normally in unison with the said main friction clutch driven member, a clutch thrust mechanism adapted to cause the said main clutch members to engage when the said friction clutch driven members are turned out of unison in one direction and to cause them to disengage when the said friction clutch driven members are turned out of unison in the other direction, and a clutch pressure limiting mechanism adapted to prevent the pressure between the said clutch members from exceeding a predetermined amount, substantially as described.

3. In a mechanism for driving tools, the combination in claim 2, together with a roller bearing introduced between the thrust cams of the clutch thrust mechanism.

4. In a mechanism for driving tools, a driving spool adapted to reel in a rope, a control spool adapted to reel in a rope and revolving normally in unison with the said driving spool, a driving mechanism adapted to drive the said driving spool, a clutch mechanism adapted to connect and disconnect the said driving mechanism and the said driving spool, and a clutch operating mechanism, said clutch operating mechanism being constructed so that when the said control spool revolves out of unison with the said driving spool the said clutch is operated, substantially as described.

5. In a mechanism for driving tools, a driving spool adapted to reel in a rope, a control spool revolving normally in unison with the said driving spool, a driving mechanism adapted to drive the said driving spool, a clutch mechanism adapted to connect and disconnect the said driving mechanism and the said driving spool, a tool frame, a control handle mounted on the said tool frame, a control rope connecting the said control handle with the said control spool, and a clutch operating mechanism, said clutch operating mechanism being constructed so that when the said control handle is pulled backwardly it will cause the said clutch mechanism to become disengaged, and when the said control handle is pushed forwardly it will cause the said clutch mechanism to become engaged, substantially as described.

6. In a mechanism for driving tools, a tool frame, a driving rope, a driving spool adapted to reel in the said driving rope, a control rope, a control spool adapted to revolve normally in unison with the said driving spool, a drive shaft adapted to drive the said driving spool, a clutch mechanism adapted to be driven by the said drive shaft and to drive the said driving spool when engaged, and a clutch operating mechanism, said clutch operating mechanism being constructed so that when the said control spool revolves out of unison with the said driving spool in one direction the said clutch mechanism becomes engaged and when the said control spool revolves out of unison with the said driving spool in the other direction the said clutch mechanism becomes disengaged, substantially as described.

7. In a braking mechanism, two driven friction disks, two braking disks adapted to be pressed in opposite directions against the said driven friction disks, two thrust cams adapted to revolve with the said braking disks, one with each, and a roller bearing placed between the said cams, the said parts being constructed so that when the said thrust cams are turned relatively to each other in one direction the braking pressure will be increased and when they are turned relatively to each other in the other direction the braking pressure will be decreased, substantially as described.

8. The combination claimed in claim 7, together with a pressure limiting mechanism adapted to prevent the braking pressure from exceeding a predetermined amount.

9. In a braking mechanism, two driven friction disks, two braking disks adapted to be pressed in opposite directions against the said driven friction disks, two thrust cams adapted to revolve with the said braking disks, one with each, the said parts being constructed so that when the said thrust cams are turned relatively to each other in one direction the braking pressure will be increased and when they are turned relatively to each other in the other direction the braking pressure will be decreased, and a pressure limiting mechanism adapted to prevent the braking pressure from exceeding a predetermined amount, substantially as described.

10. In a mechanism for driving tools, a driving rope, a control rope, a reeling mechanism adapted to reel in the said ropes, a driving mechanism adapted to drive the said reeling mechanism, a friction clutch adapted to connect and disconnect the said driving mechanism and the said reeling mechanism, a clutch operating mechanism adapted to operate the said friction clutch when suitable pulls are exerted on the said control rope, and a pressure limiting mechanism adapted to prevent the pressure between the members of the said friction clutch from exceeding a predetermined amount, substantially as described.

AARON E. BERGEY.

Witnesses:
MALINDA BERGEY,
FLORENCE BERGEY.